US011395178B2

(12) United States Patent
Morioka et al.

(10) Patent No.: US 11,395,178 B2
(45) Date of Patent: Jul. 19, 2022

(54) COMMUNICATION APPARATUS AND COMMUNICATION METHOD

(71) Applicant: Sony Corporation, Tokyo (JP)

(72) Inventors: Yuichi Morioka, Kanagawa (JP); Shigeru Sugaya, Kanagawa (JP); Kosuke Aio, Kanagawa (JP); Ryuichi Hirata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/650,869

(22) PCT Filed: Jul. 17, 2018

(86) PCT No.: PCT/JP2018/026767
§ 371 (c)(1),
(2) Date: Mar. 26, 2020

(87) PCT Pub. No.: WO2019/069533
PCT Pub. Date: Apr. 11, 2019

(65) Prior Publication Data
US 2020/0280877 A1  Sep. 3, 2020

(30) Foreign Application Priority Data

Oct. 2, 2017 (JP) .............................. JP2017-192596

(51) Int. Cl.
*H04W 28/06* (2009.01)
*H04W 56/00* (2009.01)
*H04W 72/04* (2009.01)
(52) U.S. Cl.
CPC ......... *H04W 28/06* (2013.01); *H04W 56/001* (2013.01); *H04W 72/0406* (2013.01)

(58) Field of Classification Search
CPC ........... H04W 74/002; H04W 72/0406; H04W 56/001; H04W 28/06; H04W 56/0011; H04W 84/12
See application file for complete search history.

(56) References Cited

U.S. PATENT DOCUMENTS

| 11,109,372 B2* | 8/2021 | Rico Alvarino ...... H04L 5/0073 |
| 2008/0144493 A1* | 6/2008 | Yeh ................... H04W 74/0816 370/230 |

(Continued)

FOREIGN PATENT DOCUMENTS

| CN | 106664165 A | 5/2017 |
| JP | 2014-525714 A | 9/2014 |

(Continued)

OTHER PUBLICATIONS

International Search Report and Written Opinion dated Sep. 18, 2018 for PCT/JP2018/026767 filed on Jul. 17, 2018, 14 pages including English Translation of the International Search Report.

*Primary Examiner* — Syed Ali
(74) *Attorney, Agent, or Firm* — Xsensus LLP

(57) ABSTRACT

Provided are a communication apparatus and a communication method for transmitting and receiving wireless packets.
A communication apparatus includes: a communication unit configured to transmit and receive a packet in a predetermined occupied band; and a partial band processing unit configured to provide a control signal area including predetermined control information in a part of the occupied band of the packet transmitted from the communication unit. The control information includes a plurality of synchronization signals at defined time intervals, and includes information for a third station that is not a destination of the packet, such as information regarding a NAV, a network identifier for identifying a network to which the communication apparatus (Continued)

belongs, transmission power information of the packet, allowable interference amount information, and remaining time information of the packet.

13 Claims, 11 Drawing Sheets

(56) References Cited

U.S. PATENT DOCUMENTS

| | | | |
|---|---|---|---|
| 2010/0074198 A1* | 3/2010 | Morioka | H04W 74/0816 370/329 |
| 2010/0316043 A1* | 12/2010 | Doi | H04L 27/0006 370/350 |
| 2012/0020420 A1* | 1/2012 | Sakoda | H04B 7/0408 375/259 |
| 2012/0314633 A1* | 12/2012 | Morioka | H04W 74/0816 370/310 |
| 2013/0016642 A1 | 1/2013 | Banerjea | |
| 2017/0303280 A1* | 10/2017 | Chun | H04L 5/0094 |
| 2017/0332286 A1* | 11/2017 | Lepp | H04W 36/0022 |
| 2018/0098244 A1* | 4/2018 | Sutskover | H04W 74/002 |
| 2019/0364492 A1* | 11/2019 | Azizi | H04W 68/005 |

FOREIGN PATENT DOCUMENTS

| | | |
|---|---|---|
| JP | 2016-28465 A | 2/2016 |
| JP | 2017-85635 A | 5/2017 |

* cited by examiner

COMMUNICATION APPARATUS AND COMMUNICATION METHOD

CROSS-REFERENCE TO RELATED APPLICATIONS

The present application is based on PCT filing PCT/JP2018/026767, filed Jul. 17, 2018, which claims priority to JP 2017-192596, filed Oct. 02, 2017, the entire contents of each are incorporated herein by reference.

TECHNICAL FIELD

A technology disclosed herein relates to a communication apparatus and a communication method for transmitting and receiving wireless packets.

BACKGROUND ART

With the spread of wireless local area network (LAN) systems, there arises a problem that networks overlap each other and interfere with each other, thereby deteriorating communication quality. Therefore, in IEEE 802.11 which is one of representative standards of wireless LAN systems, mechanisms for causing wireless LAN terminals to suppress transmission to avoid interference, such as a network allocation vector (NAV) and an extended inter frame space (EIFS), are incorporated (see, for example, Patent Document 1).

Further, in IEEE802.11ax which is currently in the process of standardization, various methods are studied in order to solve a problem of excessively setting the above-described transmission suppression. Specifically, there is studied a method in which own apparatus determines whether or not to perform packet transmission and sets transmission parameters such as transmission power and transmission time on the basis of information of a received signal.

CITATION LIST

Patent Document

Patent Document 1: Japanese Patent Application Laid-Open No. 2016-28465

SUMMARY OF THE INVENTION

Problems to be Solved by the Invention

An object of the technology disclosed herein is to provide a communication apparatus and a communication method for transmitting and receiving wireless packets.

Solutions to Problems

A first aspect of the technology disclosed herein is a communication apparatus including:
a communication unit configured to transmit and receive a packet in a predetermined occupied band; and
a partial band processing unit configured to provide a control signal area including predetermined control information in a part of the occupied band of the packet transmitted from the communication unit.
The partial band processing unit provides the control signal area in a time domain that does not overlap with a time domain of a synchronization signal or another control signal. Further, the control information includes information for a third station that is not a destination of the packet, such as information regarding a NAV, a network identifier for identifying a network to which the communication apparatus belongs, transmission power information of the packet, allowable interference amount information, and remaining time information of the packet.

Further, a second aspect of the technology disclosed herein is a communication method including:
a partial band process step of providing a control signal area including predetermined control information in a part of an occupied band of a packet; and
a transmission step of transmitting the packet including the control signal area.

Further, a third aspect of the technology disclosed herein is
a communication apparatus including:
a communication unit configured to transmit and receive a packet transmitted in a predetermined occupied band; and
a partial band processing unit configured to perform a process of receiving a control signal area provided in a part of the occupied band of the packet.
The partial band processing unit performs a synchronization process on the basis of a synchronization signal included in the control signal area. Further, the communication apparatus further includes a control unit configured to control packet transmission operation in the communication unit on the basis of control information included in the control signal area. The control unit sets a NAV on the basis of information regarding the NAV included as the control information. Further, the control unit determines a packet that has arrived from another network on the basis of a network identifier included as the control information, and controls spatial reuse transmission of the packet on the basis of transmission power information of the packet, allowable interference amount information, or remaining time information of the packet included as the control information.

Further, a fourth aspect of the technology disclosed herein is
a communication method including:
a reception process step of performing a process of receiving a packet transmitted in a predetermined occupied band; and
a partial band process step of performing a process of receiving a control signal area provided in a part of the occupied band of the packet.

Effects of the Invention

According to the technology disclosed herein, it is possible to provide a communication apparatus and a communication method for transmitting and receiving wireless packets.

Note that effects described herein are merely examples, and effects of the present invention are not limited thereto. Further, the present invention may also have additional effects in addition to the above-described effects.

Other objects, features, and advantages of the technology disclosed herein will be apparent from more detailed description based on embodiments described below and the accompanying drawings.

MODE FOR CARRYING OUT THE INVENTION

Hereinafter, embodiments of the technology disclosed herein will be described in detail with reference to the drawings.

In a current wireless LAN terminal, information necessary for the above-described determination on transmission and adjustment of transmission parameters is included in a preamble signal existing at the head of a packet. Information in the preamble signal is generally transmitted in a format obtainable by all wireless LAN terminals that have detected the signal.

However, with the spread of the IEEE802.11 system, there is a concern that, when partial packet collision occurs in an environment where a large number of networks overlap, a wireless LAN terminal fails to receive a preamble signal of another wireless LAN terminal. Further, even if a signal transmitted from another wireless LAN terminal arrives at a certain wireless LAN terminal, the certain wireless LAN terminal cannot receive the preamble signal in a case where the certain wireless LAN terminal performs another process (e.g., transmission of a packet or reception of another packet) at that time.

Once the wireless LAN terminal misses receiving the preamble signal, the wireless LAN terminal cannot obtain information from the middle of the packet and therefore cannot perform determination on transmission or adjustment of the transmission parameters. Such a situation is expected to become more serious in a case where wireless LAN terminals are arranged at a high density and a high traffic volume is given. Therefore, it can be said that an opportunity for a wireless LAN terminal to transmit necessary information to another wireless LAN terminal only by using a preamble signal and an opportunity for the wireless LAN terminal to obtain necessary information from another wireless LAN terminal are limited.

Figure 9:
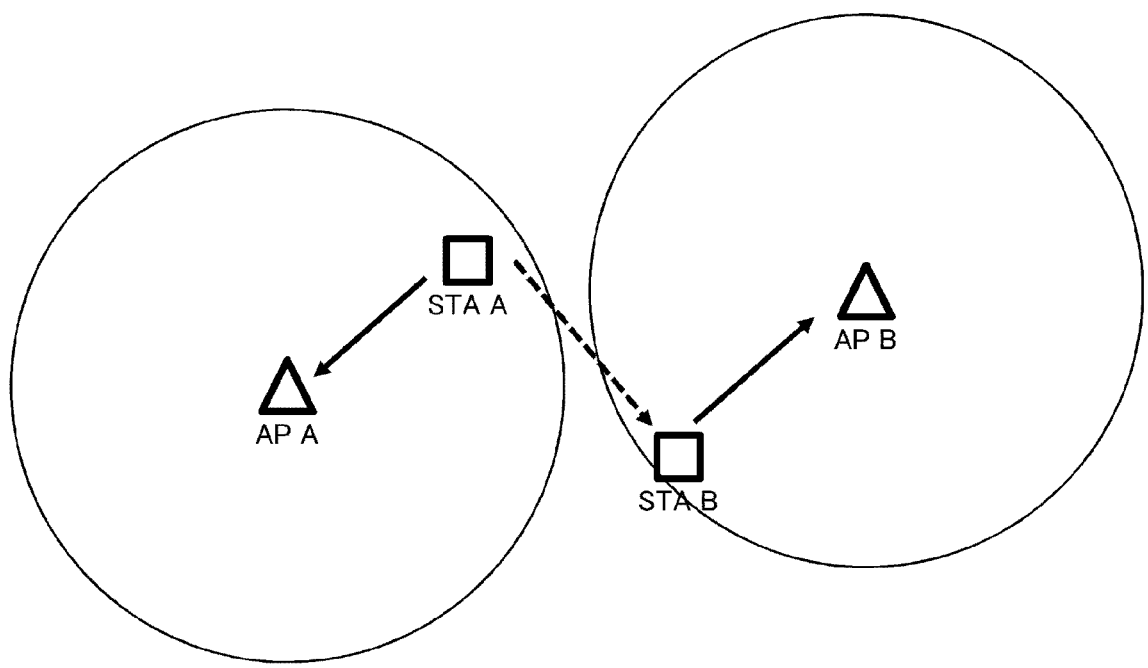
FIG. 9 shows an example of a network topology.

For example, there will be described interference control in a network topology in which cells (basic service sets: BSSs) of two access points AP A and AP B are adjacent to each other as shown in FIG. 9. In FIG. 9, a terminal STA A is connected to one access point AP A, and a terminal STA B is connected to the other access point AP B.

Each wireless LAN terminal such as an access point or a terminal transmits and receives packets by using a wireless transmission path (media) that occupies a predetermined band. Note that it is assumed that, in the network topology of FIG. 9, STA A and STA B can detect each other's signal, but STA A cannot detect a signal of AP B, or STA B cannot detect a signal of AP A due to distance attenuation.

Figure 10:
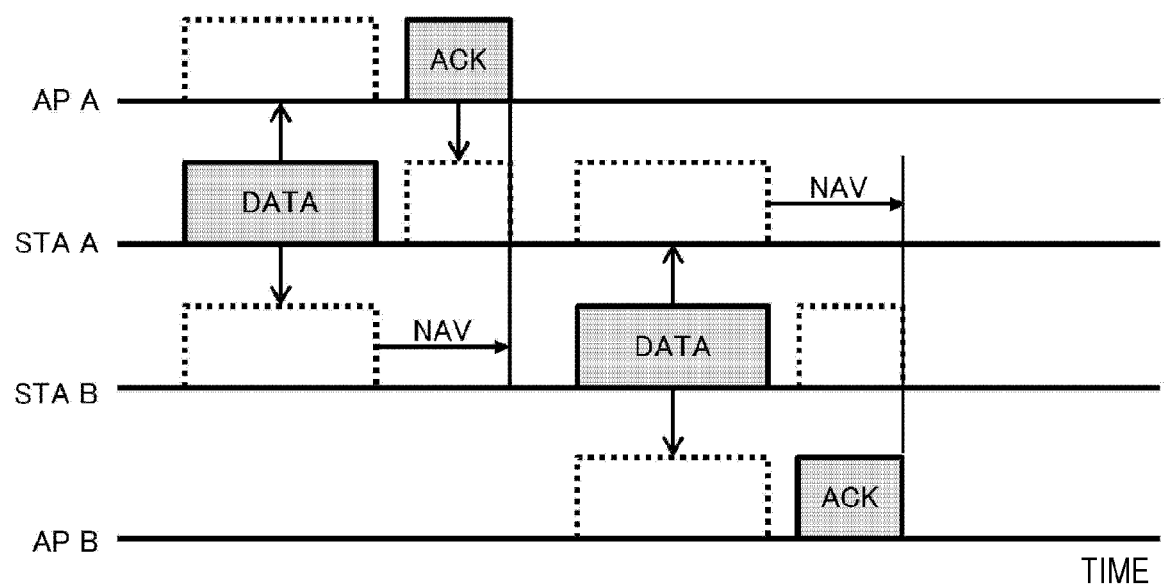
FIG. 10 shows a communication sequence example in the network topology of FIG. 9.

Further, FIG. 10 shows a communication sequence example in the network topology of FIG. 9. However, each horizontal axis in FIG. 10 indicates a time axis of each terminal (access point and terminal). Further, each square drawn with a solid line indicates a packet transmitted from a corresponding communication apparatus at a time corresponding to a position on the horizontal axis, and each square drawn with a dotted line indicates a packet arriving at or subjected to interference by the corresponding communication apparatus at a time corresponding to a position on the horizontal axis. Furthermore, arrows extending in a vertical direction from the transmission packet indicated by the solid-line square indicate a direction in which a packet is transmitted and a direction in which a packet arrives.

STA A, which first obtains a transmission right, transmits a data packet (DATA) to AP A. When STA B intercepts this data packet, STA B restrains itself from performing transmission for a duration specified in the packet (i.e., sets a NAV).

When AP A successfully receives the data packet from STA A, AP A transmits an acknowledgment packet (ACK) to STA A. STA B is in a transmission suppression period (i.e., the NAV is being set), and thus STA B cannot detect the ACK packet transmitted to STA A.

Then, when STA B obtains the transmission right after the transmission suppression period ends, STA B transmits a data packet (DATA) to AP B. When STA A intercepts this data packet, STA A restrains itself from performing transmission for a duration specified in the packet (i.e., sets a NAV).

When AP B successfully receives the data packet from STA B, AP B transmits an acknowledgment packet (ACK) to STA B. STA A is in the transmission suppression period (i.e., the NAV is being set), and thus STA A cannot detect the ACK packet to STA B.

STA B is in a state of a hidden terminal for AP A, but STA B can suppress collision (or interference) with the ACK packet transmitted from AP A by using a mechanism of the NAV as described above. Similarly, STA A is in a state of a hidden terminal for AP B, but STA A can suppress collision (or interference) with the ACK packet transmitted from AP B by using the mechanism of the NAV as described above. That is, the communication sequence of FIG. 10 is an example where interference control is successfully achieved only by using the mechanism of the NAV.

Figure 11:
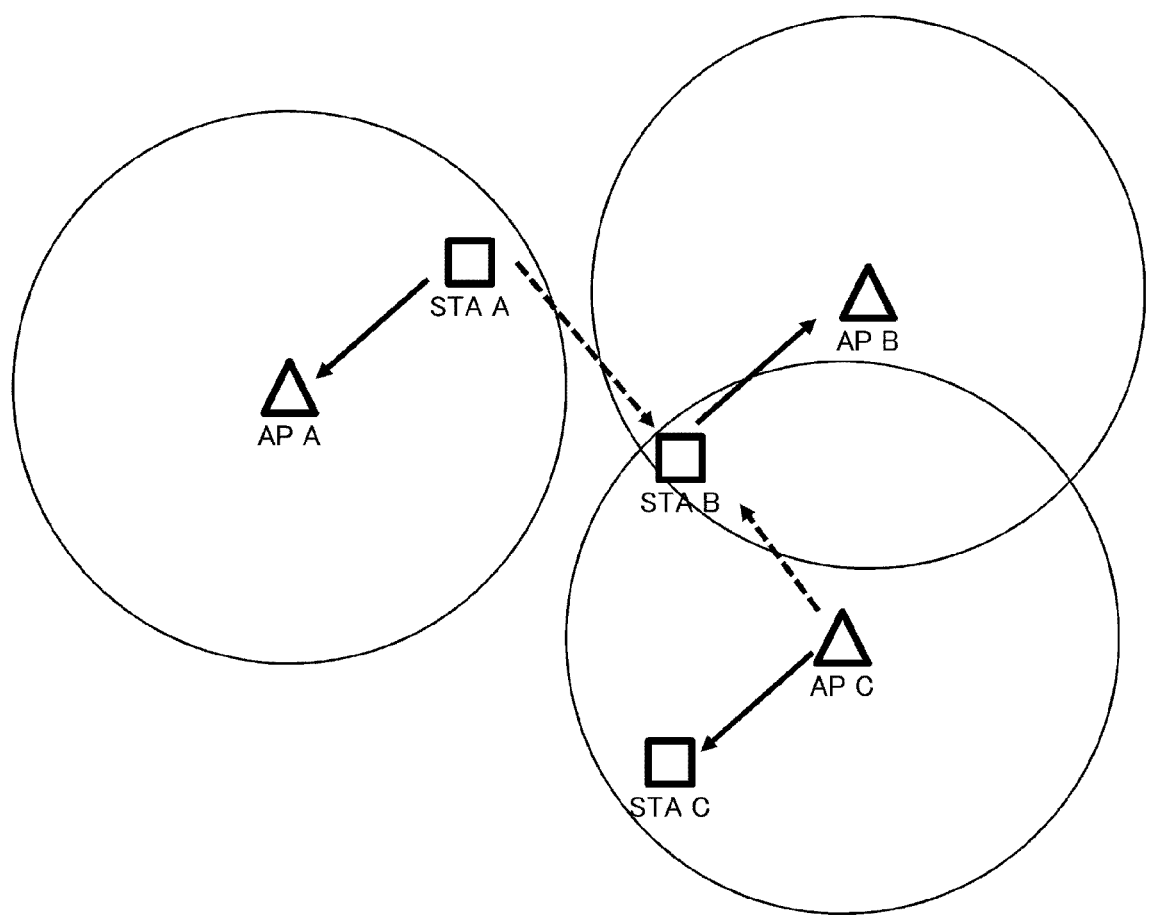
FIG. 11 shows another example (dense environment) of a network topology.

Next, there will be described a network topology in which cells of three access points AP A, AP B, and AP C are adjacent to one another, as shown in FIG. 11. The terminal STA A is connected to the access point AP A, the terminal STA B is connected to the access point AP B, and a terminal STA C is connected to the access point AP C. It can be said that FIG. 11 shows a denser environment than that in the example of FIG. 9. Herein, it is assumed that, although STA B can detect signals from STA A and AP C, STA A and AP C cannot detect each other's signal due to distance attenuation. Further, positional relationships between AP A and STA A and between AP B and STA B are similar to those in the network topology of FIG. 9.

Figure 12:
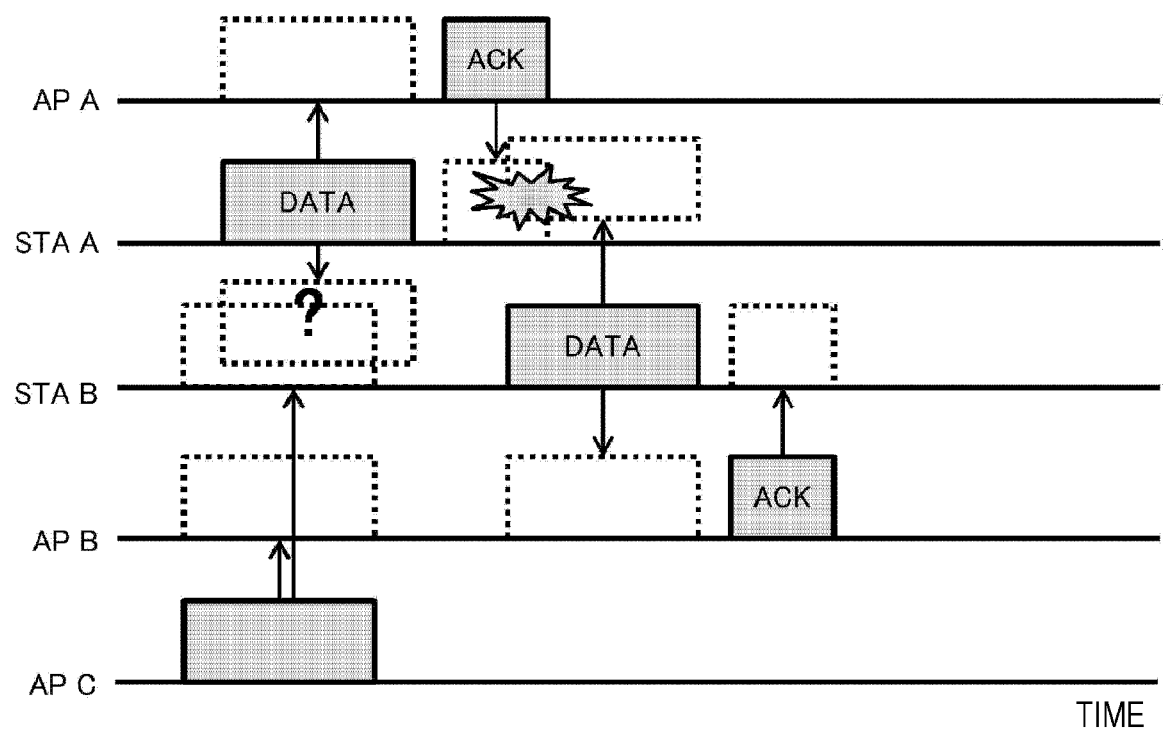
FIG. 12 shows a communication sequence example in the network topology of FIG. 11.

Further, FIG. 12 shows a communication sequence example in the network topology of FIG. 11. However, each horizontal axis in FIG. 10 indicates a time axis of each terminal (access point and terminal). Further, each square drawn with a solid line indicates a packet transmitted from a corresponding communication apparatus at a time corresponding to a position on the horizontal axis, and each square drawn with a dotted line indicates a packet arriving at or subjected to interference by the corresponding communication apparatus at a time corresponding to a position on the horizontal axis. Furthermore, arrows extending in the vertical direction from the transmission packet indicated by the solid-line square indicates a direction in which a packet is transmitted and a direction in which a packet arrives.

AP C, which first obtains a transmission right, starts transmitting a packet to STA C in the cell of AP C (not shown in FIG. 12). A data packet transmitted from AP C also arrives at the adjacent AP B and STA B. Meanwhile, STA A cannot detect a signal of AP C, and thus STA A acquires the transmission right immediately after the transmission and transmits a data packet (DATA) to AP A.

STA B is in a location where STA B can detect both the signals from STA A and AP C, but, because both the signals transmitted from STA A and AP C overlap, STA B cannot decode either signal. As a result, STA B does not set a NAV. Even in a case where both the signals transmitted from STA A and AP C only partially overlap, once STA B misses receiving a preamble signal, STA B cannot acquire accurate synchronization or cannot obtain information from the middle of the packet. Thus, STA B does not set the NAV.

Then, when the signal (which could not have been decoded) from STA A ends, STA B determines that the medium is free, obtains the transmission right, and starts transmitting a data packet. As a result, an ACK packet from AP A, which is a desired signal for STA A, collides with the data packet from STA B, and thus interference occurs. That is, the communication sequence of FIG. 12 is an example where interference control has failed due to the NAV.

As can also be seen from the examples of FIGS. 11 and 12, a mechanism for suppressing interference by using the NAV may be broken in a dense environment where a large number of networks overlap.

Even in a case where both the signals transmitted from STA A and AP C only partially overlap, once STA B misses receiving a preamble signal, STA B cannot acquire accurate synchronization or cannot obtain information from the middle of the packet. Thus, STA B cannot perform determination on transmission or adjustment of the transmission parameters.

In a case where wireless LAN terminals are arranged at a high density and a high traffic volume is given, frequency with which incoming packets overlap is increased. Therefore, the following problem becomes more serious: wireless LAN terminals cannot perform determination on transmission or adjustment of the transmission parameters. Therefore, it can be said that an opportunity for a wireless LAN terminal to transmit necessary information to another wireless LAN terminal only by using a preamble signal and an opportunity for the wireless LAN terminal to obtain necessary information from another wireless LAN terminal are limited.

In view of the above, in the following description herein, a wireless communication technology for allowing a wireless LAN terminal to transmit information so that another wireless LAN terminal can obtain necessary information even from the middle of a packet, without depending on a preamble signal is proposed.

Figure 1:
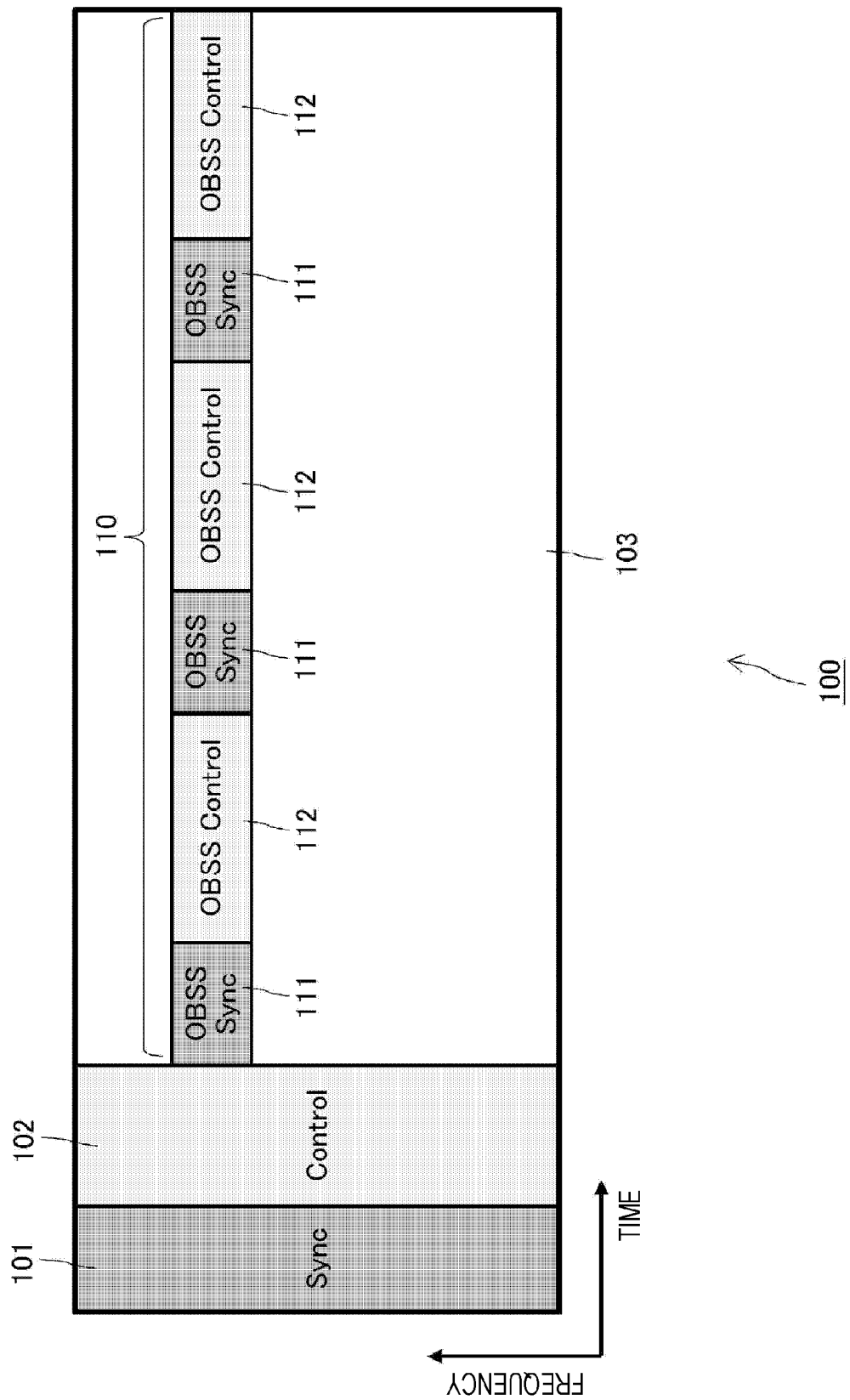
FIG. 1 shows an example of a packet format configured to obtain necessary information even from the middle of a packet.

FIG. 1 shows an example of a packet format configured to obtain necessary information even from the middle of a packet. In FIG. 1, the horizontal axis is a time axis, and the vertical axis is a frequency axis.

In a packet 100 of FIG. 1, a synchronization signal (Sync) 101 and a control signal (Control) 102 are added at the head thereof, and a data section (or payload) 103 follows after those signals.

The synchronization signal 101 includes a preamble signal for signal detection and a training signal for synchronization acquisition and phase correction. Further, the control signal 102 corresponds to a so-called header of the packet, and includes control information of a physical layer such as a modulation system and a data length, control information for media access such as a destination address and duration, and the like. The synchronization signal 101 and the control signal 102 are generally added at the head of the packet 100.

The subsequent data section 103 stores a data body to be transmitted in the packet 100. However, in this embodiment, a control signal area 110 is newly provided in a narrow band that is a part of a band occupied by the packet 100 in the data section (Data) 103. As a matter of course, instead of the narrow band, a wider band may be allocated to the data section 103 in the control signal area 110. However, an amount of information of transmission data that can be transmitted in a single packet is reduced accordingly. It should be noted that the control signal area 110 is provided so that a time domain thereof does not overlap with time domains of the existing synchronization signal 101 and control signal 102.

Control information mainly for a third station, which is denoted by a reference sign 112, is stored in the control signal area 110. The third station herein is a wireless LAN terminal (including an access point) that is not a destination of the packet 100 specified by the control signal 102. The third station is, for example, a wireless LAN terminal that belongs to another basic service set (BSS) (hereinafter, also referred to as "overlapping basic service set (OBSS)") and whose receivable range overlaps with that of a wireless LAN terminal that is a transmission source (or destination) of the packet 100.

Further, the control information for the third station includes not only NAV information but also a network identifier (BSS Color), transmission power information of the packet 100, allowable interference amount information, remaining time information of the packet 100, and the like. Note that at least part of the control information stored in the control signal area 110 may overlap with the information stored in the control signal 102 added at the head of the packet 100. Hereinafter, such control information for the third station will also be referred to as "OBSS Control".

Even in a case where a wireless LAN terminal in a receivable range of the packet 100 cannot decode the control signal 102 at the head of the packet 100 because the packet 100 partially collides with another packet, the wireless LAN terminal can appropriately set a NAV on the basis of the NAV information extracted from the control information OBSS Control if the wireless LAN terminal can decode the control information OBSS Control from the narrow band that is a part of the data section 103. This increases a possibility of successfully achieving interference control.

Further, the BSS Color serving as the network identifier is simplified BSS identification information corresponding to six bits. Even in a case where a wireless LAN terminal in a receivable range of the packet 100 cannot decode the control signal 102 at the head of the packet 100 because the packet 100 partially collides with another packet, the wireless LAN terminal can determine whether or not the packet 100 is a signal transmitted from OBSS (hereinafter, also referred to as "OBSS signal") on the basis of the BSS Color extracted from the control information OBSS Control if the wireless LAN terminal can decode the control information OBSS Control from the narrow band that is a part of the data section 103. Then, when the wireless LAN terminal determines that the packet 100 is an OBSS signal, the wireless LAN terminal can calculate transmission power, transmission time, and the like that do not interfere with a communication sequence of the packet 100 (e.g., until a transmission and reception process of the ACK packet is completed) on the basis of the transmission power information and the allowable interference amount information and can transmit a data packet by spatial reuse.

Referring to FIG. 1 again, a plurality of synchronization signals (hereinafter, also referred to as "OBSS Sync") for the third station, which is denoted by a reference sign 111, is transmitted at defined regular time intervals to the control signal area 110 that uses the narrow band that is a part of the data section 103. Further, the control information for the third station, i.e., OBSS Control is inserted between the synchronization signals OBSS Sync. It can also be said that a plurality of control information sections is provided in the control signal area 110.

The synchronization signal OBSS Sync includes a known signal. Therefore, a wireless LAN terminal in the receivable range of the packet 100 attempts to detect the synchronization signal OBSS Sync in the narrow band that is a part of the band occupied by the packet 100 only for a regular interval and acquires synchronization, thereby determining presence or absence of the control signal area 110. The same method as IEEE802.11ah that is a narrow band system is applicable to the synchronization signal OBSS Sync.

Even in a case where synchronization cannot be acquired from the synchronization signal 101 because the packet 100 partially collides with another packet, the third station can acquire synchronization even from the middle of the packet 100 by using the synchronization signal OBSS Sync, decode the control information OBSS Control, and set an appropriate NAV, thereby successfully achieving interference control. Further, when the third station determines that the packet 100 is an OBSS signal on the basis of the BSS Color in the control information OBSS Control, the third station can calculate transmission power, transmission time, and the like that do not interfere with the communication sequence of the packet 100 (e.g., until the transmission and reception process of the ACK packet is completed) and can transmit a data packet by spatial reuse.

Figure 2:
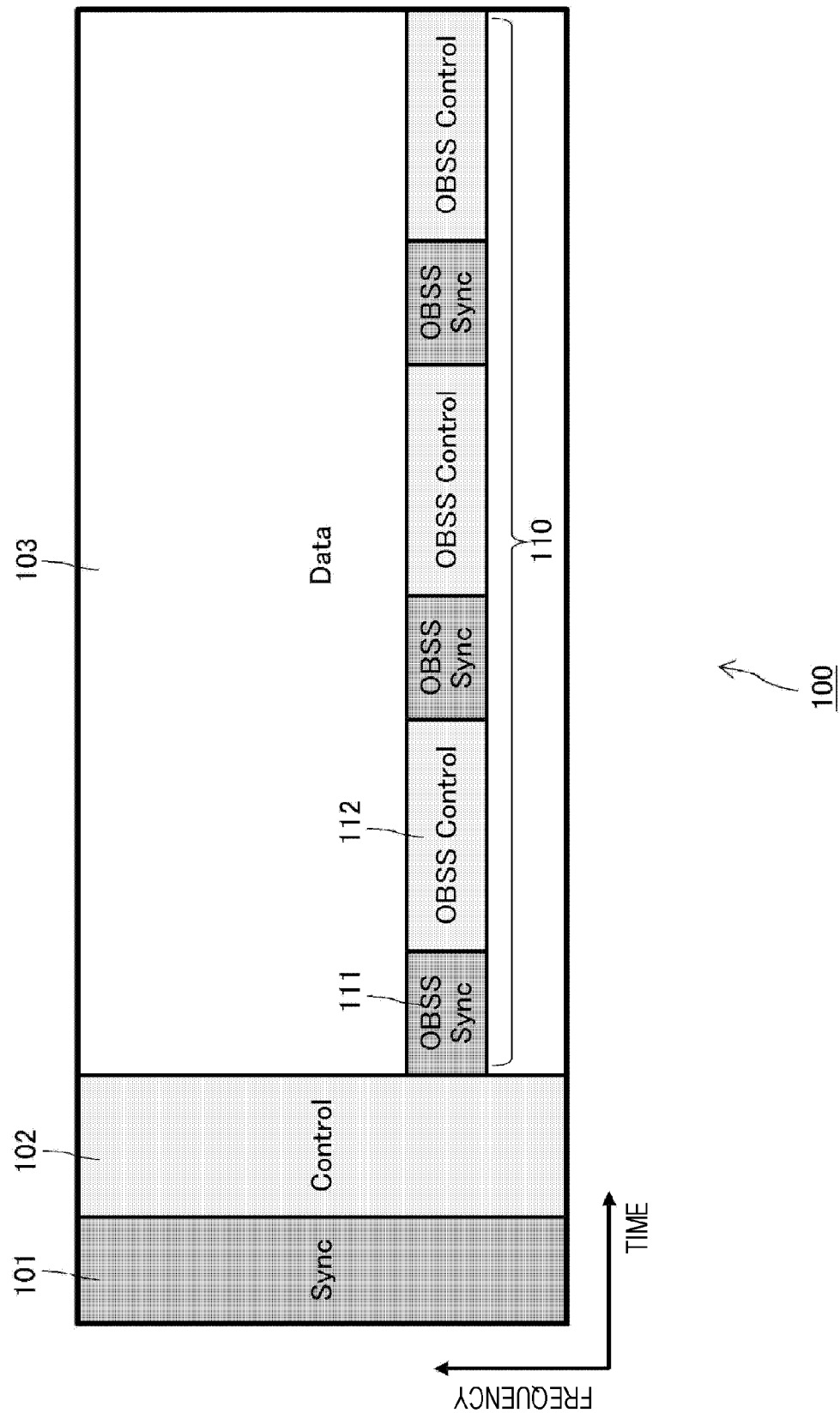
FIG. 2 shows a modification example of the packet format of FIG. 1.

Note that frequency position information of the band in which the control signal area 110 is provided in the data section 103 of the packet 100 is shared in the network system (or between BSSs). In the example of FIG. 1, the control signal area 100 is provided at a relatively high frequency position in the band occupied by the packet 100, but an available band is not limited thereto. For example, as shown in FIG. 2, the control signal area 100 may be provided at a relatively low frequency position in the band occupied by the packet 100. Further, different frequency positions may be allocated to the respective BSSs in the occupied area of the packet.

Figure 3:
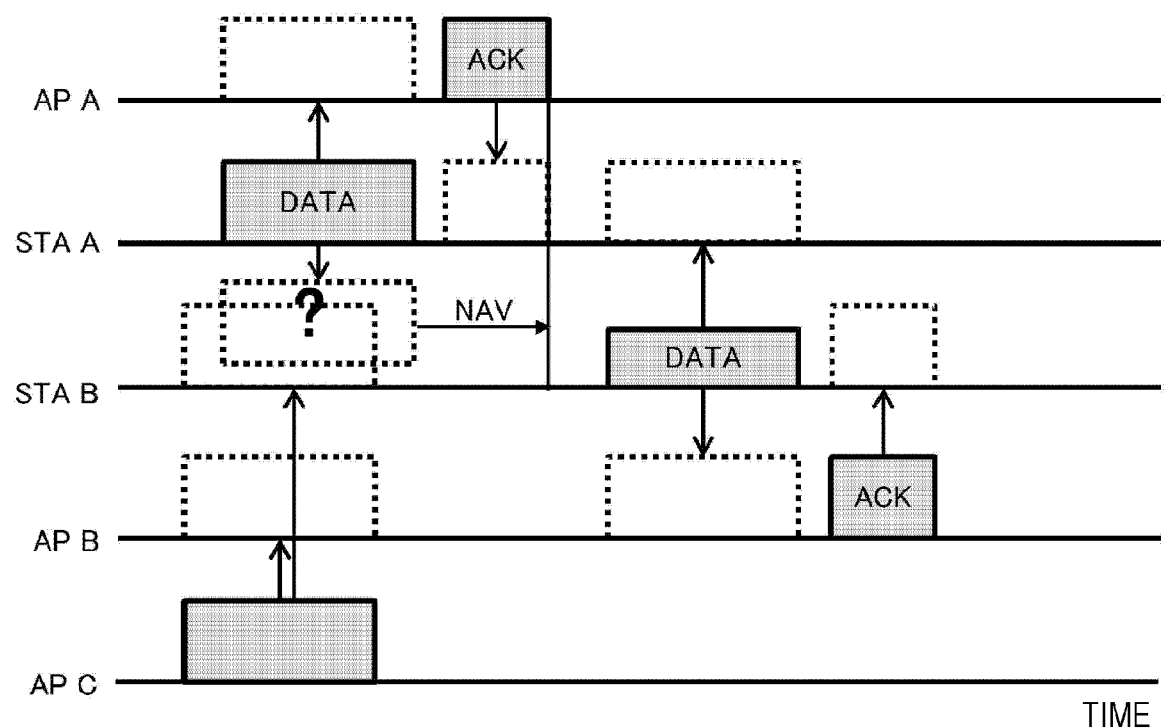
FIG. 3 shows a communication sequence example in a network topology using the packet format of FIG. 1.

FIG. 3 shows a communication sequence example where the packet format of FIG. 1 is applied in the dense network topology of FIG. 11. However, each horizontal axis in FIG. 10 indicates a time axis of each terminal (access point and terminal). Further, each square indicates a packet transmitted from a corresponding communication apparatus at a time corresponding to a position on the horizontal axis. Further, arrows extending in the vertical direction from a packet indicates a direction in which the packet arrives. Furthermore, the height of a square indicating a transmission packet indicates transmission power.

AP C, which first obtains a transmission right, starts transmitting a data packet (DATA) to STA C in the cell of AP C (not shown in FIG. 3). At this time, STA A cannot detect a signal of AP C, and thus STA A acquires the transmission right immediately after the transmission and transmits a data packet (DATA) to AP A.

STA B is in a location where STA B can detect both the signals from STA A and AP C. Therefore, data packets transmitted from both STA A and AP C partially collide with each other.

STA B attempts to detect the synchronization signal OBSS Sync for a certain period in a narrow band that is a part of the data packet from STA A. Then, when STA B detects the synchronization signal OBSS Sync and determines that there is a control signal area in a data area of the data packet, STA B acquires synchronization on the basis of the synchronization signal OBSS Sync and decodes the control information OBSS Control. Then, STA B sets a NAV of an appropriate period on the basis of the NAV information specified in the decoded control information OBSS Control, and restrains itself from performing transmission.

When AP A successfully receives the data packet from STA A, AP A transmits an acknowledgment packet (ACK) to STA A. STA B is in the transmission suppression period (i.e., the NAV is being set), and thus STA A cannot detect the ACK packet transmitted to STA A. Then, when STA B obtains the transmission right after the transmission suppression period ends, STA B transmits a data packet (DATA) to AP B.

STA B is in a state of a hidden terminal for AP A. Even in the dense environment where packets partially collide (see FIG. 11), STA B can acquire the NAV information from the data section of the packet arriving from STA A and set the NAV of the appropriate period by using the packet format (see FIG. 1) in which the control signal area is provided in the narrow band that is a part of the band occupied by the packet. This makes it possible to suppress collision with interference (or interference) with the ACK packet transmitted from AP A.

Further, even in the dense environment where packets partially collide (see FIG. 11), STA B can acquire information necessary for packet transmission by spatial reuse, such as the BSS Color, the transmission power information, and the allowable interference amount information, from the data section of the packet arriving from AP C, i.e., OBSS by using the packet format (see FIG. 1) in which the control signal area is provided in the narrow band that is a part of the band occupied by the packet.

Then, when STA B determines that an incoming packet from AP C that has partially collided is an OBSS signal, STA B can calculate transmission power, transmission time, and the like that do not interfere with the communication sequence of the packet (e.g., until the transmission and reception process of the ACK packet is completed) and can transmit a data packet by spatial reuse. In the example of FIG. 3, STA B transmits a data packet to AP B by reducing transmission power. As a result, STA B can obtain more transmission opportunities. Further, in the whole system, frequency resources are effectively used and space utilization efficiency is increased, and thus throughput can be improved.

Figure 4:
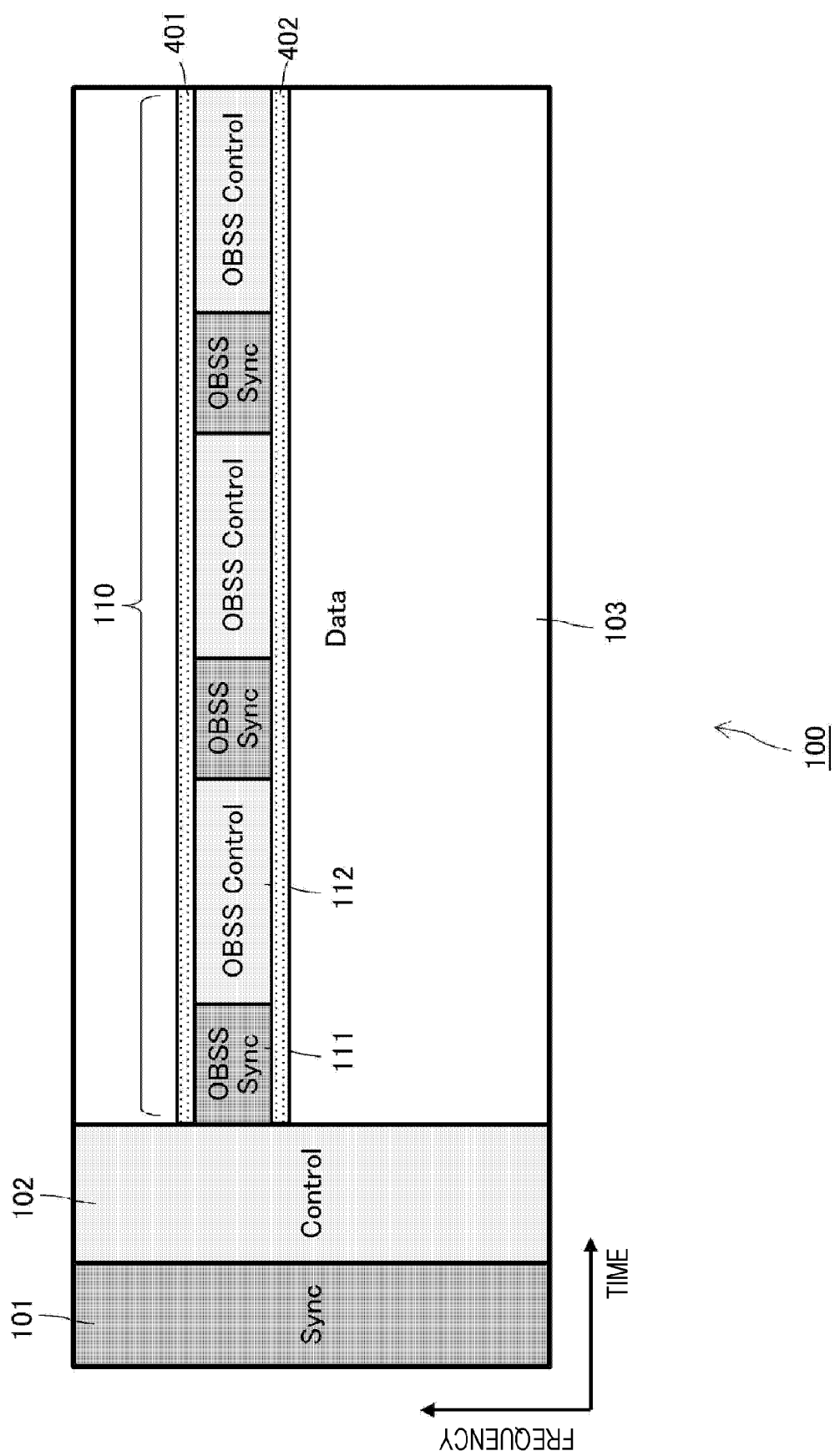
FIG. 4 shows a modification example of the packet format of FIG. 1.

FIG. 4 shows a modification example of the packet format of FIG. 1. As already described with reference to FIG. 1, the control signal area 110 is newly provided in a narrow band that is a part of the band occupied by the packet 100 in the data section 103 of the packet 100. In the packet format of FIG. 4, non-signal areas (in very narrow bands), which are denoted by reference signs 401 and 402, are provided as a guard band in areas adjacent to the control signal area 110 on a high frequency side and a low frequency side thereof. By providing such non-signal areas 401 and 402 adjacent to the control signal area 110 on the respective high and low frequency sides, a terminal that receives the packet 100 can easily extract the control signal area 110 from the data section 103. The non-signal areas 401 and 402 have a bandwidth of, for example, about one to several carriers. Note that there is also a packet format in which a guard band is provided only in an area adjacent to the control signal area 110 on the high frequency side or the low frequency side (i.e., only one of the non-signal areas 401 and 402 is provided).

Figure 5:
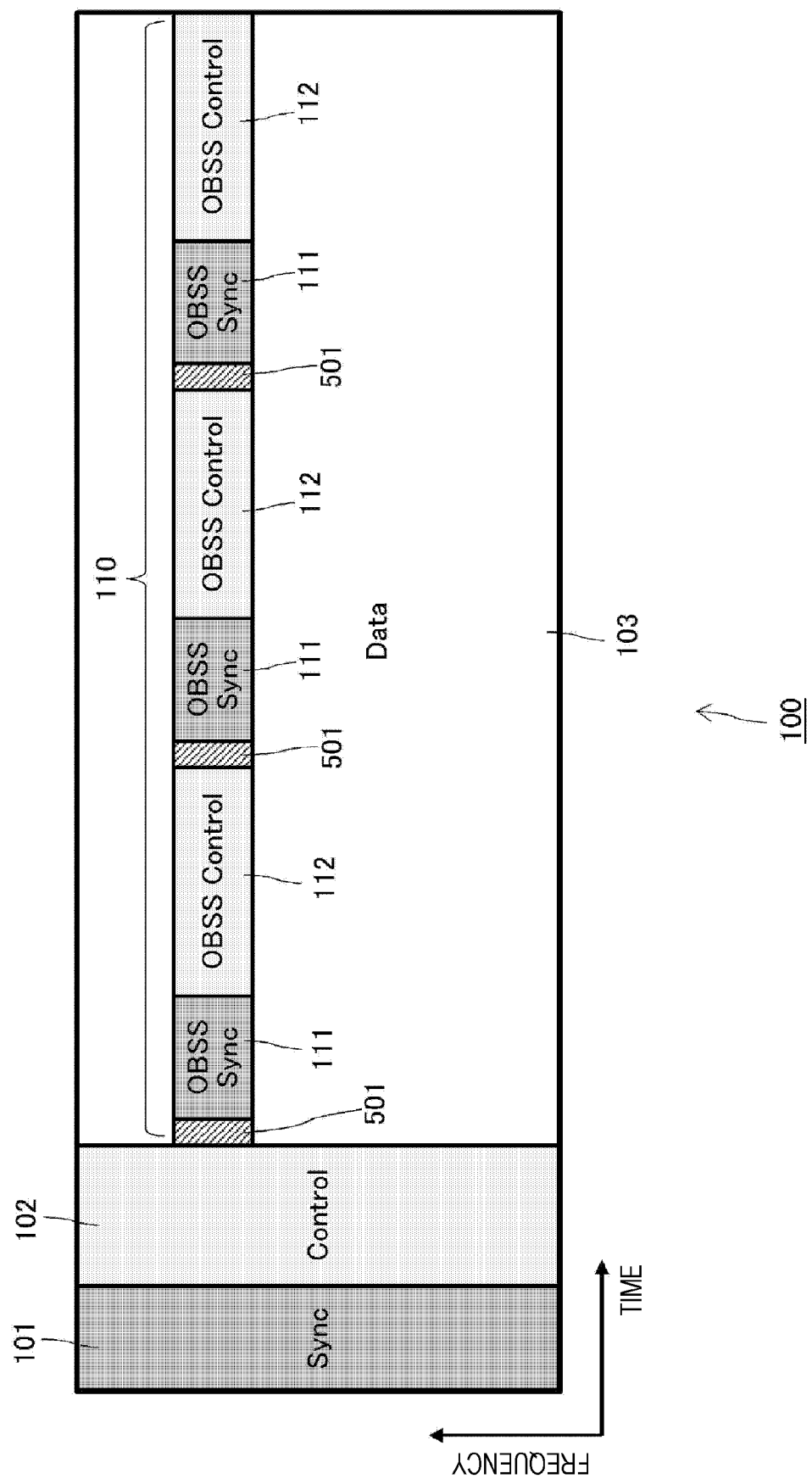
FIG. 5 shows a modification example of the packet format of FIG. 1.

Further, FIG. 5 shows another modification example of the packet format of FIG. 1. As already described with reference to FIG. 1, a plurality of synchronization signals OBSS Sync for the third station is repeatedly transmitted at defined regular time intervals to the control signal area 110 provided in the narrow band that is a part of the band occupied by the packet 100 in the data section 103 of the packet 100, and the control information OBSS Control for the third station is inserted between the synchronization signals OBSS Sync. In the packet format of FIG. 5, a non-signal area denoted by a reference sign 501 is provided as a gap in a time domain immediately before each synchronization signal OBSS Sync. By providing such the non-signal area 501 immediately before each synchronization signal OBSS Sync, a terminal for receiving the packet 100 can easily extract the control signal area 110, and can acquire synchronization even from the middle of the packet 100.

Note that FIGS. 4 and 5 show the packet format examples where one of the non-signal areas, i.e., the guard band or the gap is provided in the control signal area 110. However, as a matter of course, there is also a packet format in which both the non-signal areas, i.e., both the guard band and the gap are provided in the control signal area 110.

Figure 6:
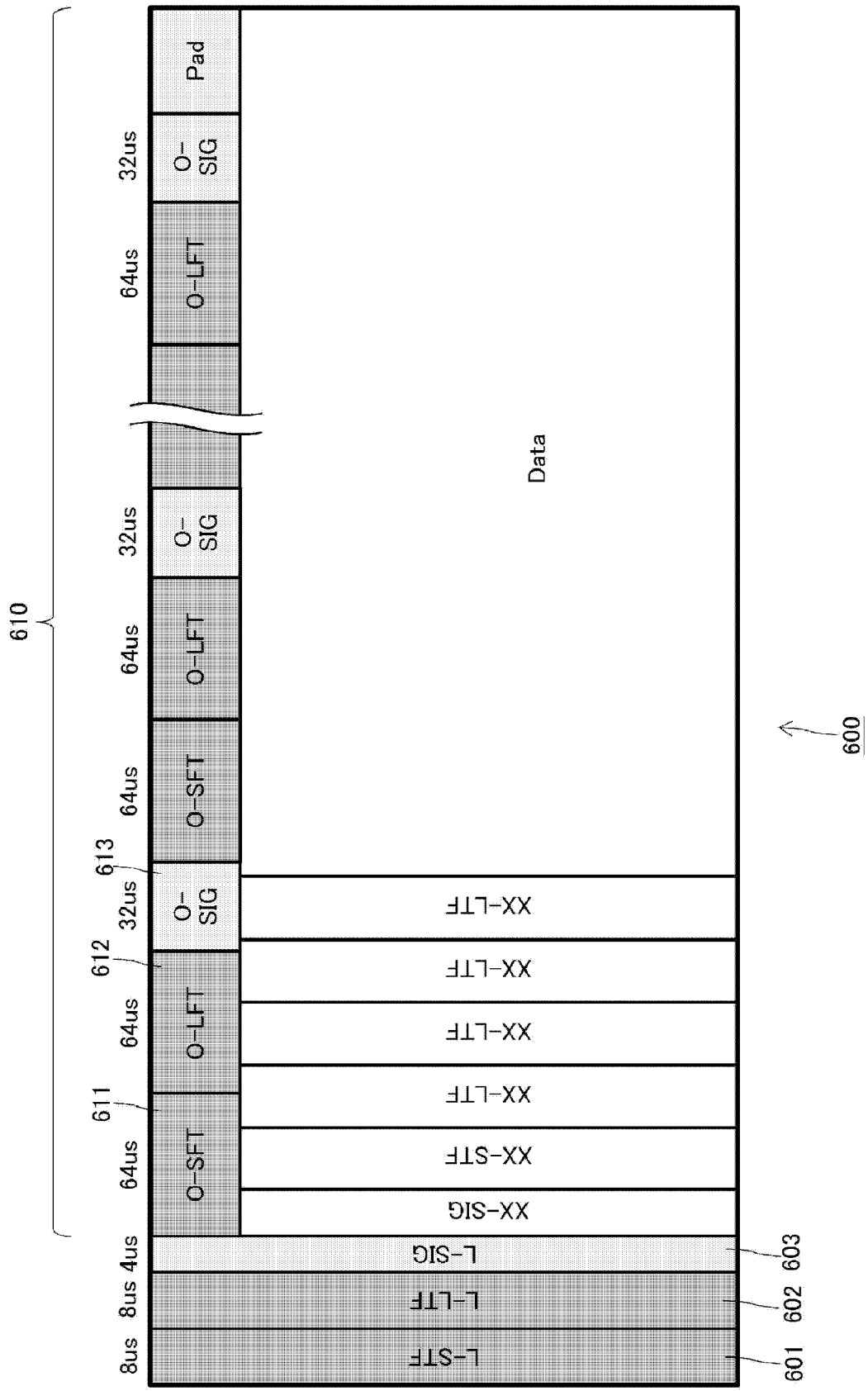
FIG. 6 shows a specific example of a packet format in which a control signal area is provided in a narrow band that is a part of an occupied band.

FIG. 6 shows a specific example of a packet format in which a control signal area is newly provided in a narrow band that is a part of an occupied band, the example being assumed to be applied to the IEEE802.11 system. A packet 600 of FIG. 6 occupies a band of 20 MHz.

A legacy-short training field (L-STF) for eight microseconds from the beginning of the packet 600, which is denoted by a reference sign 601, and a legacy-long training field (L-LTF) following L-STF for eight microseconds, which is denoted by a reference sign 602, are both transmitted in a packet occupied band of 20 MHz. L-STF and L-LTF have known training patterns and correspond to the synchronization signal 102 of FIG. 1. For example, L-STF is mainly used for coarse synchronization acquisition, and L-LTF is mainly used for detailed synchronization acquisition and phase correction.

In four microseconds after L-LTF denoted by a reference sign 603, a legacy-signal (L-SIG) corresponding to the control signal 102 in FIG. 1 is similarly transmitted in the packet occupied band of 20 MHz. The L-SIG stores control information such as a transmission rate and a data length of the data section. However, the content of description of the L-SIG does not directly relate to the technology disclosed herein, and thus detailed description thereof is omitted.

The above-described L-STF 601, L-LTF 602, and L-SIG 603 correspond to, for example, a preamble and a header in a packet of a conventional format (Legacy). In addition, time after twelve microseconds from the beginning of the packet 600 corresponds to the data section 103 of the packet format of FIG. 1.

In the packet format example of FIG. 6, a control signal area 610 is provided in the data section by using a band of 2.5 MHz corresponding to ⅛ of the packet occupied band of 20 MHz. In the example of FIG. 6, the control signal area 610 is allocated to the 2.5 MHz band from the highest frequency position in the packet occupied band of 20 MHz. However, the band to which the control signal area 610 is allocated is not particularly limited to the example of FIG. 6, and the 2.5 MHz band at an arbitrary frequency position in the packet occupied band of 20 MHz may be allocated to the control signal area 610.

As similarly described with reference to FIG. 1, a plurality of synchronization signals for the third station is transmitted to the control signal area 610 provided in the 2.5 MHz band corresponding to ⅛ of the packet occupied band of 20 MHz at defined regular intervals, and control information for the third station is transmitted between those synchronization signals.

O-STF (OBSS-STF) and O-LTF (OBSS-LTF) denoted by reference signs 611 and 612, respectively, correspond to the synchronization signal OBSS-Sync for the third station transmitted in the control signal area 610. As can be seen from FIG. 6, the O-STF 611 and the O-LTF 612 are repeatedly transmitted at defined regular time intervals.

Even in a case where the third station cannot acquire synchronization by receiving the L-STF 601 and the L-LTF 602 due to partial collisions of packets or the like, the third station can acquire synchronization even from the middle of the packet 600 by using the O-STF 611 and the O-LTF 612 repeatedly transmitted in the control signal area 610 provided in the narrow band that is a part of the packet occupied band of 20 MHz. Specifically, the third station can acquire coarse synchronization by using the O-STF 611 and can further acquire detailed synchronization and perform phase correction by using the O-LTF 612.

Further, O-SIG (OBSS-SIGNAL) denoted by a reference sign 613 corresponds to the control signal OBSS-Control for the third station. As can be seen from FIG. 6, the O-SIG is transmitted between the synchronization signals of the O-STF 611 and the O-LTF 612 in the control signal area 610. The O-SIG 613 includes not only NAV information but also a network identifier (BSS Color), transmission power information of the packet 600, allowable interference amount information, remaining time information of the packet 600, and the like (same as above).

Even in a case where the third station cannot decode control information for interference control, spatial reuse transmission, or the like from the header sections 601 to 603 due to, for example, partial collision of the packet 600, the third station can suitably decode the control information O-SIG in the control signal area 610 through acquiring synchronization by using the O-STF 611 and the O-LTF 611 in the control signal area 610 provided in the narrow band that is a part of the occupied band of the packet 600 of 20 MHz.

Then, the third station can determine whether or not the received packet 600 is an OBSS signal on the basis of the BSS Color extracted from the O-SIG 613. When the third station determines that the received packet 600 is an OBSS signal, the third station can calculate transmission power, transmission time, and the like that do not interfere with a communication sequence of the packet 600 (e.g., until a transmission and reception process of the ACK packet is completed) and can transmit a data packet by spatial reuse.

Note that it is also assumed that additional control information and an additional synchronization signal are transmitted in the data section of the packet 600. For example, there is a case where control information and a synchronization signal conforming to a newly established communication standard are transmitted in the data section of the packet 600. In the packet format example of FIG. 6, XX-SIG corresponds to the additional control information, and XX-STF and XX-LTF correspond to additional synchronization signals. These additional control information XX-SIG and additional synchronization signals XX-STF and XX-LTF are added to the head section of the data section. The additional synchronization signals XX-STF and XX-LTF and the additional control information XX-SIG are, for example, synchronization signals and a control signal corresponding to an extension to the IEEE 802.11 standard. Specifically, synchronization signals and control information established after the standard in which the control signal area is provided in a part of the packet occupied band are transmitted as XX-STF, XX-LTF, and XX-SIG.

Resources of the additional control information XX-SIG and the additional synchronization signals XX-STF and XX-LTF cannot overlap with those of the conventional control information L-SIG and the conventional synchronization signals L-STF and L-LTF. Further, it is assumed that the additional control information XX-SIG and the additional synchronization signals XX-STF and XX-LTF are transmitted in the entire occupied band of the packet 600 of 20 MHz in the data section of the packet 600. However, as shown in FIG. 6, in a case where the narrow band that is a part of the occupied band of the packet 600 is allocated to the control signal area 610 for the third station, the additional control information XX-SIG and the additional synchronization signals XX-STF and XX-LTF are transmitted by using resources of the data section excluding the control signal area 610. That is, the control signal area 610 is provided so that time domains in the control signal area 610 overlap with those of the synchronization signals XX-STF and XX-LTF and the control information XX-SIG arranged in the data section 610.

Note that, in a case where the control signal area 610 for the third station occupies a bandwidth that is ⅛ of the occupied band of the packet 600 of 20 MHz, a time length of the control signal area 610 needs to be eight times as long as that of the synchronization signals L-STF and L-LTF and the control information L-SIG in order to ensure the same detection accuracy as that of the synchronization signals L-STF and L-LTF transmitted in the entire occupied band of the packet 600 of 20 MHz or to transmit the same amount of information as the control information L-SIG transmitted in the entire occupied band of the packet 600 of 20 MHz. The time length of the control signal area 610 should be determined in accordance with required detection accuracy or the amount of information to be transmitted. It is conceivable that a transmission process is simplified by setting the time length of the synchronization signal O-STF or the like to an integral multiple of a symbol length of other parts of the packet 600.

Further, it is conceivable that, in a case where a synchronization signal for the third station and control information for the third station are inserted and a remaining time exists in the control signal area 610, padding is provided in this remaining area. This padding signal (Pad) may be configured with, for example, a known pattern indicating a terminal end of the packet 600.

Further, the synchronization signal for the third station includes a plurality of candidate patterns. Therefore, it is also conceivable that further information is transmitted by a synchronization signal pattern for the third station or frequency arrangement in the occupied band of the packet.

Note that, although not shown in FIG. 6, a guard band may be provided in at least one area above or below the control signal area 610, as in the packet format of FIG. 4. By providing the guard band, a terminal that receives the packet 600 can easily extract the control signal area 610 from the data section.

Further, although not shown in FIG. 6, a gap may be provided in a time domain immediately before each O-STF 611 in the control signal area 610, as in the packet format of FIG. 5. By providing the gap area, a terminal that receives the packet 600 can easily acquire synchronization even from the middle of the packet 600.

Figure 7:
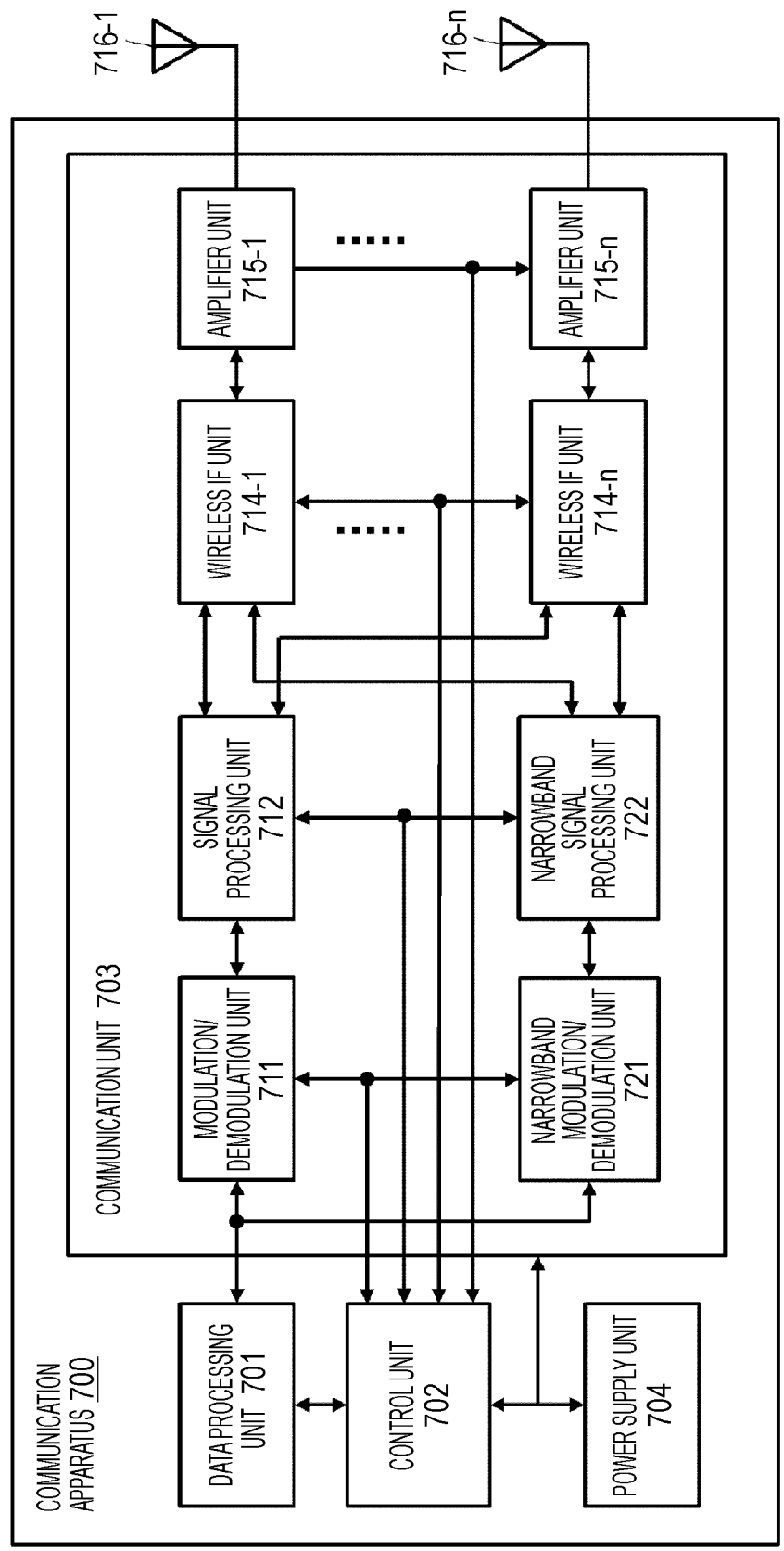
FIG. 7 shows a configuration example of a communication apparatus 700 to which the technology disclosed herein is applicable.

FIG. 7 shows a configuration example of a communication apparatus 700 to which the technology disclosed herein is applicable. The communication apparatus 700 of FIG. 7 transmits and receives a packet by using a wireless transmission path (medium) that occupies a predetermined band, and has a function of transmitting control information by using a narrow band that is a part of a band occupied by the packet or a function of performing a process of receiving control information transmitted by using the narrow band that is a part of the band occupied by the packet. The communication apparatus 700 can operate as either AP or STA in, for example, the network topologies of FIGS. 10 and 11.

The communication apparatus 700 includes a data processing unit 701, a control unit 702, a communication unit 703, and a power supply unit 704. Moreover, the communication unit 703 further includes a modulation/demodulation unit 711, a signal processing unit 712, a wireless interface (IF) unit 714, an amplifier unit 715, and an antenna 716. Note that one wireless interface unit 714, one amplifier unit 715, and one antenna 716 are one set, and one or more sets may be provided as a component. Further, a function of the amplifier unit 715 may be included in the wireless interface unit 714. Note that the antenna 716 is a part of the communication apparatus 700 (or the communication unit 703) or is externally attached to the communication apparatus 700 (or the communication unit 703) (i.e., is not a component of the communication apparatus 700).

At the time of transmission, i.e., when data is input from a protocol upper layer (not shown), the data processing unit 701 generates a packet for wireless transmission on the basis of the data, performs a process for adding a header for media access control (MAC), a process for adding an error detection code, and the like, and provides the processed data for the modulation/demodulation unit 711 in the communication unit 703. Meanwhile, at the time of reception, i.e., when the data processing unit 701 receives input from the modulation/demodulation unit 711, the data processing unit 701 performs MAC header analysis, packet error detection, a reorder process, and the like, and provides the processed data for the protocol upper layer thereof.

The control unit 702 controls exchange of information between the units in the communication apparatus 700. Further, the control unit 702 performs parameter setting in the modulation unit 711 and the signal processing unit 712, and scheduling of a packet in the data processing unit 701. Furthermore, the control unit 702 performs parameter setting and transmission power control of the wireless interface unit 714 and the amplifier unit 715.

Further, in a case where the communication apparatus 700 transmits control information by using the narrow band that is a part of the band occupied by the packet or performs the process of receiving control information transmitted by using the narrow band that is a part of the band occupied by the packet, the control unit 702 also performs parameter setting in a narrowband modulation unit 721 and a narrowband signal processing unit 722.

At the time of transmission of a signal using the occupied band of the packet, the modulation/demodulation unit 711 performs encoding, interleaving, and modulation on data input from the data processing unit 701 on the basis of coding and a modulation system set by the control unit 702, generates a data symbol stream, and provides the data symbol stream for the signal processing unit 712. Further, at the time of reception of a signal using the occupied band of the packet, the modulation/demodulation unit 711 performs a process reverse to the process at the time of transmission on input from the signal processing unit 712, and provides the received data for the data processing unit 701 or the control unit 702.

At the time of transmission of a signal using the occupied band of the packet, the signal processing unit 712 performs a signal process on input from the modulation/demodulation unit 711, and provides one or more resultant transmission symbol streams for the respective wireless interface units 714. Further, at the time of reception of a signal using the occupied band of the packet, the signal processing unit 712 performs a signal process on a received symbol stream input from each wireless interface unit 714, and provides the received symbol stream for the modulation/demodulation unit 711.

Note that the signal processing unit 712 performs spatial processing as necessary, such as spatial multiplexing processing of a plurality of streams at the time of signal transmission and spatial decomposition processing of a plurality of streams of a received signal at the time of signal reception. Therefore, the signal processing unit 712 calculates a complex channel gain information of a propagation path on the basis of a preamble section and a training signal section of the input signal from each wireless interface unit 214, and uses the complex channel gain information for spatial processing.

When control information for the third station is transmitted by using the narrow band that is a part of the occupied band of the packet in response to determination of the control unit 702, the narrowband modulation/demodulation unit 721 performs encoding, interleaving, and modulation on input data from the control unit 702 on the basis of the coding and the modulation system set by the control unit 702, generates a data symbol stream, and provides the data symbol stream for the narrowband signal processing unit 722. Further, when the control information for the third station transmitted by using the narrow band that is a part of the occupied band of the packet is received, the narrowband modulation/demodulation unit 721 performs the process reverse to the process at the time of transmission on input from the narrowband signal processing unit 722, and provides the received data for the control unit 702.

At the time of transmission of a signal using the narrow band that is a part of the occupied band of the packet, the narrowband signal processing unit 722 performs a signal process in the narrow band on input from the narrowband modulation/demodulation unit 721, and provides one or more resultant transmission symbol streams for the respective wireless interface units 714. As already described with reference to FIG. 1, the narrowband signal processing unit 722 repeatedly arranges a plurality of synchronization signals OBSS Sync and pieces of control information OBSS Control in a predetermined narrow band at the time of transmission. Note that, in a case where there is a plurality of candidate patterns of the synchronization signals OBSS Sync, the narrowband signal processing unit 722 may use the synchronization signal OBSS Sync having a pattern corresponding to information to be further transmitted. Further, at the time of reception of a signal transmitted in the narrow band that is a part of the occupied band of the packet, the narrowband signal processing unit 722 performs a signal process in the narrow band on the received symbol streams input from the respective wireless interface units 714 and provides the received symbol streams for the narrowband modulation/demodulation unit 721. That is, at the time of reception, the narrowband signal processing unit 722 attempts to detect the synchronization signal OBSS Sync only for a regular interval in a predetermined narrow band. Then, in a case where the narrowband signal processing unit 722 can acquire synchronization by using the synchronization signal OBSS Sync, the narrowband modulation/demodulation unit 721 can decode the control information OBSS Control in the predetermined narrow band. Note that, in a case where there is a plurality of candidate patterns of the synchronization signals OBSS Sync, the narrowband signal processing unit 722 may detect transmitted information in accordance with the detected pattern of the synchronization signals OBSS Sync.

At the time of signal transmission, the wireless interface unit 714 converts input from the signal processing unit 712 into an analog signal, performs filtering and up-conversion to a carrier frequency, and transmits the signal to the antenna 716 or the amplifier unit 715. When control information for the third station is transmitted in a part of the band occupied by the packet, the wireless interface unit 714 converts input from the narrowband signal processing unit 722 into an analog signal, performs filtering and up-conversion to a carrier wave, and transmits the signal to the antenna 716 or the amplifier unit 715.

Further, at the time of signal reception, the wireless interface unit 714 performs the reverse process on input from the antenna 716 or the amplifier unit 715 and provides data for the signal processing unit 712. In a case where control information for the third station is transmitted in a part of the band occupied by the packet, the wireless interface unit 714 provides data in the corresponding narrow band for the narrowband signal processing unit 722.

At the time of signal transmission, the amplifier unit 715 amplifies the analog signal input from the wireless interface unit 714 to predetermined power and transmits the signal to the antenna 716. Further, at the time of signal reception, the amplifier unit 715 amplifies the signal input from the antenna 716 to predetermined power with low noise and outputs the signal to the wireless interface unit 714. At least one of the functions of the amplifier unit 715 at the time of transmission or reception may be included in the wireless interface unit 714.

The power supply unit 704 includes a battery power supply or a fixed power supply, and supplies power to each unit in the communication apparatus 200.

Figure 8:
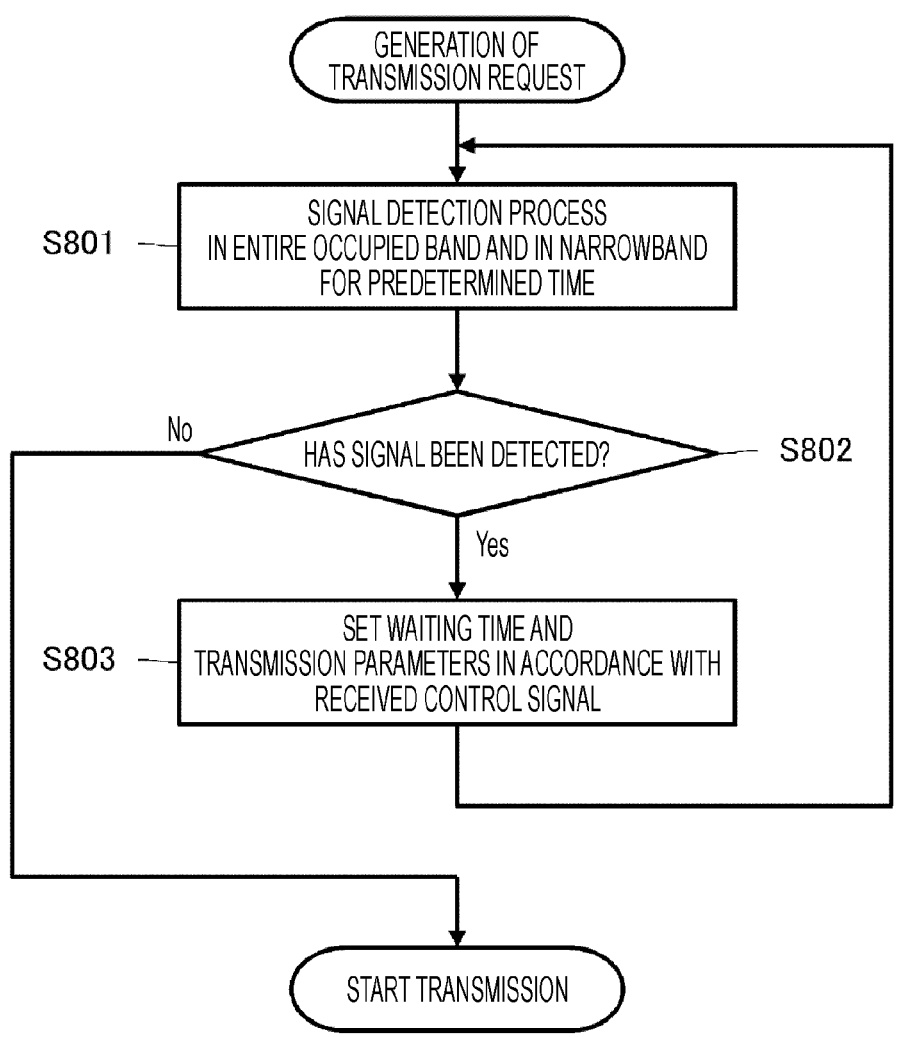
FIG. 8 is a flowchart showing a processing procedure performed by the communication apparatus 700 to suppress interference.

FIG. 8 shows a processing procedure performed by the communication apparatus 700 of FIG. 7 to suppress interference in the form of a flowchart. The processing procedure of FIG. 8 is basically achieved by the control unit 702 in the communication apparatus 700. In the following description, the packet format of FIG. 1 is used for simplification of description. However, it should be fully understood that cancellation can be suppressed according to a similar processing procedure also in a case where the packet formats of FIGS. 2 and 4 to 6 are used.

When a transmission request is generated in the protocol upper layer, the control unit 702 instructs each unit to perform a signal detection process only in a predetermined period (step S801).

In this embodiment, as the signal detection process in step S801, a normal signal detection process in the occupied band of the packet and a signal detection process in the narrow band that is a part of the packet are performed in parallel. The signal detection process in the occupied band of the packet is executed by the signal processing unit 712 and the modulation/demodulation unit 711. Further, the signal detection process in the narrow band that is a part of the occupied band of the packet is executed by the narrowband signal processing unit 722 and the narrowband modulation/demodulation unit 721.

In a case where the signal processing unit 712 and the modulation/demodulation unit 711 detect the synchronization signal 101 at the head of the incoming packet 100 and successfully acquire synchronization (Yes in step S802), the signal processing unit 712 and the modulation/demodulation unit 711 can decode the subsequent control signal 102 to obtain control information and can further decode the data section 103 (step S803). In a case where the incoming packet 100 is transmitted to the own station, the entire data section 103 is decoded and a reception process is performed as the process in step S803. Meanwhile, in a case where the incoming packet 100 is not transmitted to the own station, a NAV is set in accordance with NAV information specified in the packet 100 to suppress transmission.

Further, as the signal detection process in step S801, the narrowband signal processing unit 722 and the narrowband modulation/demodulation unit 721 attempt to detect the synchronization signal OBSS Sync only for a regular interval in the control signal area 110 that uses the narrow band that is a part of the data section 103, and determine presence or absence of the control signal area 110. Then, in a case where the narrowband signal processing unit 722 and the narrowband modulation/demodulation unit 721 can acquire synchronization by using the synchronization signal OBSS Sync, the narrowband signal processing unit 722 and the narrowband modulation/demodulation unit 721 decode the control information OBSS Control for the third station inserted between the signals OBSS Syncs.

Therefore, even in a case where the signal processing unit 712 and the modulation/demodulation unit 711 cannot detect the synchronization signal 101 at the head of the packet 100 because the incoming packet 100 has been partially collided (or in a case where the signal processing unit 712 and the modulation/demodulation unit 711 can acquire synchronization but cannot decode the control signal 102), the narrowband signal processing unit 722 and the narrowband modulation/demodulation unit 721 can obtain control information transmitted in the narrow band that is a part of the occupied area of the packet.

When the control unit 102 detects a synchronization signal (OBSS Sync) from the narrow band that is a part of the data section 103, synchronizes on the basis of the synchronization signal, and can therefore receive a control signal (OBSS Control) (Yes in step S802), the control unit 102 sets an additional waiting time (NAV) and adjusts a transmission parameter such as transmission power for transmitting a packet in accordance with the received control signal (step S803), and starts transmitting a packet when the waiting time elapses. Further, when, although the control unit 102 performs the signal detection process for a regular time, none of the signal processing unit 712, the modulation/demodulation unit 711, the narrowband signal processing unit 722, and the narrowband modulation/demodulation unit 721 detects the synchronization signal or the control signal (No in step S802), the control unit 102 determines that the medium is free and immediately starts transmitting a packet.

When the signal processing unit 712 and the modulation/demodulation unit 711 detect the synchronization signal 101 at the head of the packet 100 and can decode the control signal 102 (Yes in step S802), a normal packet reception process is performed in step S803. That is, in a case where the communication apparatus 700 itself is a destination of the incoming packet 100, the control unit 702 instructs each unit to perform demodulation and decoding processes of the data section 103 of the packet 100, and notifies the protocol upper layer of the decoded received data. Meanwhile, in a case where the communication apparatus 700 itself is not a destination of the packet 100, the control unit 702 issues an instruction to set a NAV on the basis of, for example, duration information specified in the MAC header. Further, the control unit 102 may perform spatial reuse transmission of a packet as the process in step S803. That is, the control unit 102 determines whether or not the incoming packet 100 is an OBSS signal on the basis of the network identifier (BSS Color) obtained by decoding the data section 103 of the packet 100. Then, when it is determined that the packet 100 is an OBSS signal, the control unit 702, similarly, the control unit 702 obtained from the data section 103, similarly calculates transmission power, transmission time, and the like that do not interfere with the communication sequence of the packet 100 (e.g., until the transmission and reception process of the ACK packet is completed) on the basis of the transmission power information and the allowable interference amount information extracted from the control information OBSS Control, and issues an instruction to transmit a data packet by spatial reuse.

Further, when the narrowband signal processing unit 722 and the narrowband modulation/demodulation unit 721 detect the synchronization signal OBSS Sync for the third station from the narrow band that is a part of the data section 103 and can decode the control information OBSS Control for the third station (Yes in step S802), in step S803, the control unit 702 issues an instruction to set a NAV on the basis of the NAV information extracted from the control information OBSS Control.

Further, the control unit 102 may perform spatial reuse transmission of a packet as the process in step S803. That is, the control unit 102 determines whether or not the incoming packet 100 is an OBSS signal on the basis of the network identifier (BSS Color) extracted from the control information OBSS Control. Then, when it is determined that the packet 100 is an OBSS signal, the control unit 702 similarly calculates transmission power, transmission time, and the like that do not interfere with the communication sequence of the packet 100 (e.g., until the transmission and reception process of the ACK packet is completed) on the basis of the transmission power information and the allowable interference amount information extracted from the control information OBSS Control, and issues an instruction to transmit a data packet by spatial reuse.

When the communication apparatus 700 monitors a usage status of the medium (band occupied by the packet 100) for a predetermined time before packet transmission and detects other signals, i.e., when another user uses the medium, the processing procedure of FIG. 8 basically controls interference by suppressing transmission for the predetermined time (Note that, in a system conforming to IEEE802.11ax, "to suppress transmission" includes spatial reuse transmission by control of transmission power.). The processing procedure of FIG. 8 has the following main feature: when the usage status of the medium is monitored, the normal signal detection process in the occupied band of the packet and the signal detection process in the narrow band that is a part of the occupied band of the packet are performed in parallel.

INDUSTRIAL APPLICABILITY

As described above, the technology disclosed herein has been described in detail with reference to specific embodiments. However, it is obvious that those skilled in the art can make modifications and substitutions of the embodiments, without departing from the scope of the technology disclosed herein.

According to the technology disclosed herein, information that is originally transmitted by using a preamble signal can also be transmitted by using an OFDM signal subsequent to the preamble signal. Therefore, even if a wireless terminal on the reception side misses the preamble signal, the wireless terminal can obtain the information even from the middle of a packet. According to the technology disclosed herein, for example, information necessary for packet transmission by spatial reuse can be obtained even from the middle of the packet. Therefore, a wireless terminal can obtain more transmission opportunities and effectively use frequency resources. This also improve throughput of the entire system.

The technology disclosed herein is applicable to, for example, a wireless communication system conforming to IEEE802.11ax. However, as a matter of course, by similarly applying the technology to various wireless LAN systems that perform packet communication by using a wireless transmission path that occupies a predetermined band, it is possible to improve an interference control function and to suitably perform packet transmission by spatial reuse.

In short, although the technology disclosed herein has been described by using examples, the content of description herein should not be interpreted in a limited manner. The claims should be taken into consideration in order to determine the gist of the technology disclosed herein.

Note that the technology disclosed herein can also be configured as follows.

(1) A communication apparatus, including:
a communication unit configured to transmit and receive a packet in a predetermined occupied band; and
a partial band processing unit configured to provide a control signal area including predetermined control information in a part of the occupied band of the packet transmitted from the communication unit.

(2) The communication apparatus according to (1), in which
the partial band processing unit provides the control signal area in the part of the occupied band in a data section of the packet.

(3) The communication apparatus according to (1) or (2), in which
the partial band processing unit provides the control signal area in a time domain that does not overlap with a time domain of a synchronization signal or another control signal.

(4) The communication apparatus according to any one of (1) to (3), in which
the control information includes information for a third station that is not a destination of the packet.

(5) The communication apparatus according to any one of (1) to (4), in which
the control information includes information regarding a NAV.

(6) The communication apparatus according to any one of (1) to (5), in which
the control information includes at least one of a network identifier for identifying a network to which the communication apparatus belongs, transmission power information of the packet, allowable interference amount information, or remaining time information of the packet.

(7) The communication apparatus according to any one of (1) to (6), in which
the control signal area includes a synchronization signal.

(8) The communication apparatus according to any one of (1) to (7), in which
the control signal area includes a plurality of synchronization signals at defined time intervals.

(9) The communication apparatus according to (8), in which
the control signal area includes a plurality of control information sections.

(10) The communication apparatus according to any one of (1) to (9), in which
the partial band processing unit includes, in the control signal area, a synchronization signal having a pattern corresponding to information to be transmitted.

(11) The communication apparatus according to any one of (1) to (10), in which
the partial band processing unit provides a non-signal area in a band adjacent to the control signal area on at least one of a high frequency side or a low frequency side.

(12) The communication apparatus according to any one of (1) to (11), in which
the partial band processing unit provides a non-signal area in a time domain immediately before a synchronization signal in the control signal area.

(13) A communication method, including:
a partial band process step of providing a control signal area including predetermined control information in a part of an occupied band of a packet; and
a transmission step of transmitting the packet including the control signal area.

(14) A communication apparatus, including:
a communication unit configured to transmit and receive a packet transmitted in a predetermined occupied band; and
a partial band processing unit configured to perform a process of receiving a control signal area provided in a part of the occupied band of the packet.

(15) The communication apparatus according to (14), in which
the partial band processing unit performs a synchronization process on the basis of a synchronization signal included in the control signal area.

(16) The communication apparatus according to (14) or (15), further including
a control unit configured to control packet transmission operation in the communication unit on the basis of control information included in the control signal area.

(17) The communication apparatus according to (16), in which
the control unit sets a NAV on the basis of information regarding the NAV included as the control information.

(18) The communication apparatus according to (16) or (17), in which the control unit determines a packet that has arrived from another network on the basis of a network identifier included as the control information.

(19) The communication apparatus according to (16) or (17), in which the control unit controls transmission of the packet on the basis of transmission power information of the packet, allowable interference amount information, or remaining time information of the packet included as the control information.

(20) A communication method, including:

a reception process step of performing a process of receiving a packet transmitted in a predetermined occupied band; and a partial band process step of performing a process of receiving a control signal area provided in a part of the occupied band of the packet.

REFERENCE SIGNS LIST

700 Communication apparatus
701 Data processing unit
702 Control unit
703 Communication unit
704 Power supply unit
711 Modulation/demodulation unit
712 Signal processing unit
714 Wireless interface unit
715 Amplifier unit
716 Antenna
721 Narrowband modulation/demodulation unit
722 Narrowband signal processing unit

The invention claimed is:

1. A communication apparatus, comprising:
circuitry configured to:
transmit and receive a packet in a predetermined occupied band, the packet including a preamble, a header, and a payload;
provide a control signal area including predetermined control information from the header in a narrowband of the predetermined occupied band in the payload of the packet transmitted, the control signal area including a plurality of synchronization signals at defined time intervals, a plurality of control information sections, and a synchronization signal of the plurality of synchronization signals having a pattern corresponding to information to be transmitted, wherein the control information includes information regarding a network allocation vector (NAV); and
provide the control signal area in a time domain that does not overlap with a time domain of a synchronization signal of the plurality of synchronization signals or another control signal.

2. The communication apparatus according to claim 1, wherein
the control information includes information for a third station that is not a destination of the packet.

3. The communication apparatus according to claim 1, wherein
the control information includes at least one of a network identifier for identifying a network to which the communication apparatus belongs, transmission power information of the packet, allowable interference amount information, or remaining time information of the packet.

4. The communication apparatus according to claim 1, wherein
the circuitry is configured to provide a non-signal area in a band adjacent to the control signal area on at least one of a high frequency side or a low frequency side in the predetermined occupied band in the payload of the packet.

5. The communication apparatus according to claim 1, wherein
the circuitry is configured to provide a non-signal area in a time domain immediately before a synchronization signal of the plurality of synchronization signals in the control signal area.

6. The communication apparatus according to claim 1, wherein
a synchronization signal of the plurality of synchronization signals in the control signal area is from the preamble.

7. A communication method, comprising:
providing a control signal area including predetermined control information in a narrowband of an occupied band of a packet, the packet including a preamble, a header, and a payload, wherein predetermined control information is from the header and the control signal area is in the payload of the packet, the control signal area including a plurality of synchronization signals at defined time intervals, a plurality of control information sections, and a synchronization signal of the plurality of synchronization signals having a pattern corresponding to information to be transmitted;
providing the control signal area in a time domain that does not overlap with a time domain of a synchronization signal of the plurality of synchronization signals or another control signal, wherein the control information includes information regarding a network allocation vector (NAV); and
transmitting the packet including the control signal area.

8. A communication apparatus, comprising:
circuitry configured to:
transmit and receive a packet transmitted in a predetermined occupied band, the packet including a preamble, a header, and a payload;
receive a control signal area including predetermined control information from the header provided in a narrowband of the predetermined occupied band in the payload of the packet received, wherein the control signal area includes a plurality of synchronization signals at defined time intervals, a plurality of control information sections, and a synchronization signal of the plurality of synchronization signals having a pattern corresponding to information to be transmitted and the control signal area is in a time domain that does not overlap with a time domain of a synchronization signal of the plurality of synchronization signals or another control signal; and
detect a network allocation vector (NAV) on a basis of information regarding a NAV included in the control information.

9. The communication apparatus according to claim 8, wherein
the circuitry is configured to perform a synchronization process on a basis of a synchronization signal of the plurality of synchronization signals included in the control signal area.

10. The communication apparatus according to claim 8, further comprising
the circuitry is configured to control packet transmission operation on a basis of control information included in the control signal area.

11. The communication apparatus according to claim 10, wherein
the circuitry is configured to determine a packet that has arrived from another network on a basis of a network identifier included as the control information.

12. The communication apparatus according to claim 10, wherein
the circuitry is configured to control transmission of the packet on a basis of transmission power information of the packet, allowable interference amount information, or remaining time information of the packet included as the control information.

13. A communication method, comprising:
receiving a packet transmitted in a predetermined occupied band, the packet including a preamble, a header, and a payload;
receiving a control signal area including predetermined control information from the header provided in a narrowband of the predetermined occupied band in the payload of the packet received, wherein the control signal area includes a plurality of synchronization signals at defined time intervals, a plurality of control information sections, and a synchronization signal of the plurality of synchronization signals having a pattern corresponding to information to be transmitted and the control signal area is in a time domain that does not overlap with a time domain of a synchronization signal of the plurality of synchronization signals or another control signal; and
detecting a network allocation vector (NAV) on a basis of information regarding a NAV included in the control information.

* * * * *